(12) United States Patent
Rudelic

(10) Patent No.: US 7,073,040 B2
(45) Date of Patent: Jul. 4, 2006

(54) MULTILEVEL SEGMENTED MEMORY

(75) Inventor: John C. Rudelic, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 346 days.

(21) Appl. No.: 10/668,713

(22) Filed: Sep. 23, 2003

(65) Prior Publication Data

US 2005/0066130 A1   Mar. 24, 2005

(51) Int. Cl.
*G06F 12/00* (2006.01)
(52) U.S. Cl. ...................................... 711/173; 711/101
(58) Field of Classification Search ...................... None
See application file for complete search history.

(56) References Cited

U.S. PATENT DOCUMENTS 6,842,823 B1 * 1/2005 Olson ........................ 711/129
6,907,508 B1 * 6/2005 Dearth et al. ............... 711/173
2002/0147900 A1 * 10/2002 Tashiro et al. .............. 711/173
2003/0110361 A1 * 6/2003 Kanehira et al. ........... 711/154
2004/0044849 A1 * 3/2004 Stence et al. ............... 711/126

OTHER PUBLICATIONS

Andrew S. Tanenbaum and Albert S. Woodhull, Operating Systems—Design and Implemention, 1997, 2nd Edition, pp. 343-356.*
Sahni, Data Structures, Algorithms, and Applications in Java, 2000, pp. 190, 191, 204.*

* cited by examiner

*Primary Examiner*—Reginald Bragdon
*Assistant Examiner*—Shawn Gu
(74) *Attorney, Agent, or Firm*—Trop, Pruner & Hu, P.C.

(57) ABSTRACT

In one embodiment, a multilevel segmented memory device may be used to store persistent data in a first memory level and dynamic data in a second memory level. In the first level, data fragments may grow in an ascending order, and sequence tables may grow in a descending order. In the second level, object pointers may grow in a descending order, and data units grow in an ascending order.

21 Claims, 3 Drawing Sheets

MULTILEVEL SEGMENTED MEMORY

BACKGROUND

Processor-based systems, whether computers, communications devices, instrumentation equipment or the like, have historically selected memories of different technological and architectural types to satisfy divergent data storage requirements. Regularly the attributes and application of the data to be stored inform the selection of the memory type that is used to store the data. That is to say, system designers generally attempt to match the performance characteristics of various memory types to the nature of the data to be stored or to the use to which the data is to be put.

However, the selective allocation of data to disparate memory devices, depending on either the nature or the intended application of the data, tends to preclude a coherent or uniform approach to the manner m which data is managed in a system. To wit: techniques that are appropriate to the management of transitory data stored in semiconductor SRAM (static random access memory) are likely to be inapposite to the management of persistent data stored in CMOS (complementary metal oxide semiconductor) ROM (read only memory). Furthermore, although a number of emerging memory technologies have appeared that promise performance capabilities that may enable the storage of both persistent data and dynamic data, there does not yet exist a comprehensive approach to the management of disparate data types in a unified memory system. (In this regard, a "unified" memory system may be considered to be one that exhibits a combination of properties, such as nonvolatility, nondestructability, cell density and access speeds, that had not heretofore been available in a single memory type.)

A unified memory subsystem, whether predicated on the OUM or on another emerging or existing memory technology, requires a memory management subsystem that takes full advantage of the potential of the unified memory subsystem. The specific memory management techniques applied to SRAM, DRAM, flash memory, etc. are not satisfactorily cobbled in to an effective and efficient approach to the management of unified memory. Thus there exists a need for a coherent technique for the management of dissimilar types of data in a unified memory device.

BRIEF DESCRIPTION OF THE DRAWINGS

The subject multilevel segmented memory may be better understood by, and its many features, advantages and capabilities made apparent to, those skilled in the art with reference to the Drawings that are briefly described immediately below and are attached hereto, in the several Figures of which identical reference numerals (if any) refer to identical or similar elements, and wherein.

Figure 1:
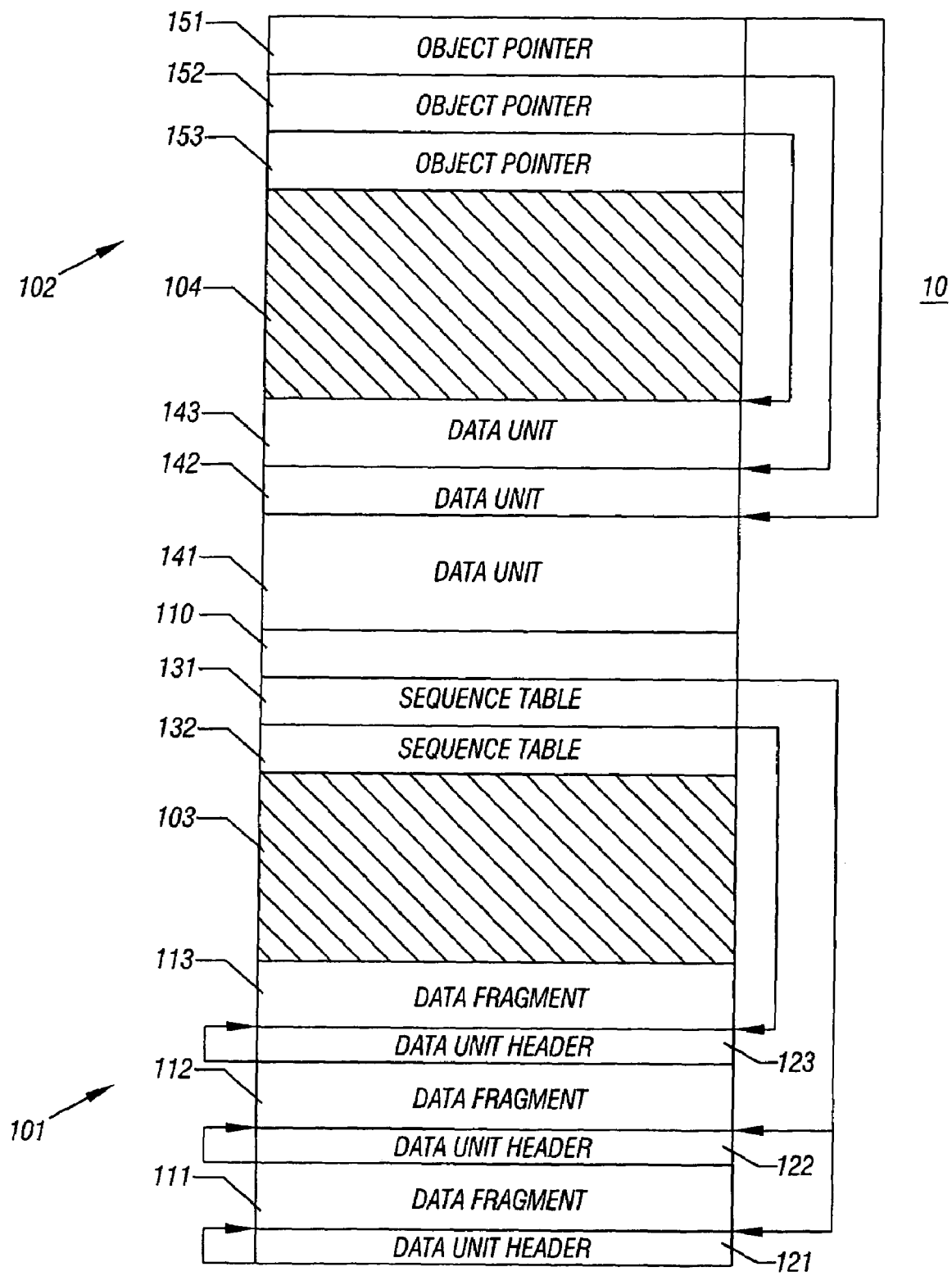
FIG. 1 is a memory map in accordance with one embodiment of the invention.

Skilled artisans appreciate that elements in Drawings are illustrated for simplicity and clarity and have not (unless so stated in the Description) necessarily been drawn to scale. For example, the dimensions of some elements in the Drawings may be exaggerated relative to other elements to promote and improve understanding of embodiments of the invention.

DETAILED DESCRIPTION

Referring now to FIG. 1, depicted therein is a multilevel segmented memory 10 in accordance with one embodiment of the invention. In the embodiment of FIG. 1, memory 10 is seen to include at least two levels, level 101 and level 102, separated by memory management boundary 110. (For purposes of this Description, a memory "level" refers to a collection of (more or less) contiguous physical memory locations. Consequently, a memory "level" may here be considered to refer also to an "area" of memory.) Only two memory levels are explicitly depicted in FIG. 1. Consequently, memory 10 may be referred to as a "dual-level" memory. However, in other embodiments more than merely two levels may be present. In general, level 101 may be used to store a first type of data, for example, persistent data; whereas level 102 may be used to store a second type, for example, dynamic, or transitory, data. (For purposes of this Description, the term "data" is used expansively herein to encompass any form of information that may be retained in a storage device. Such information includes, but is not limited to, numerical or alphanumerical values, program code and instructions, textual or graphical information, and the like.)

As seen in FIG. 1, memory level 101 comprises a number of memory segments, 111, 112, and 113. As will be made clear below, memory segments 111, 112, and 113 in memory level 101, may be used to store data fragments. Each memory segment comprises a respective number of discrete memory locations that comprise a predetermined number of memory cells (not shown). In some embodiments, the number of memory locations that constitute a segment may be fixed to a predetermined number, such as, 10 K bytes (where 1 K =1024); but such is not necessarily the case. In general, data fragment segments 111, 112, 113, etc. may be varying sizes.

In the embodiment of FIG. 1, memory level 101 includes data fragment segments 111, 112 and 113 for storing persistent data fragments. In addition, memory level 101 includes a number of data unit headers 121, 122 and 123, with each of the data unit headers being associated with a respective one of the data fragment segments 111, 112 and 113. In a manner that will be made clear below, each of the data unit headers corresponds to a data unit (in second level 102) with respect to which a data fragment is a constituent element. The data unit headers may contain information that characterizes and identifies a respective data unit, as by specifying the type, size and source of the data unit.

First memory level 101 may also comprise a plurality of sequence tables. Two sequence tables 131 and 132 are depicted in FIG. 1, although the scope of the present invention is not limited in this regard. Sequence tables 131 and 132 may contain information that defines the order in which data fragments that are stored in data fragment segments are to be synthesized into a coherent data unit. For illustrative purposes, sequence table 131 is shown in FIG. 1 to link data fragments stored in data fragment segments 111 and 112. However, be aware that, in general, sequence tables 131 and 132 have the capability to link a large number of data fragment segments, even though only two data fragment segments are shown as linked by sequence table 131, for example. Furthermore, no implication is intended that a sequence table is constrained to link data fragment segments that occupy contiguous or consecutive positions in memory level 101.

Finally, memory level 101 exhibits an indeterminate number of contiguous memory locations that are unused.

Accordingly, an unused memory area 103 exists in first memory level 101 between lowest sequence table 132 and uppermost data fragment segment 113. Of course, the size (in terms of memory locations consumed) of unused area 103 varies in accordance with the total number of memory locations in memory level 101, and in accordance with the number of those locations that are occupied by data fragment segments, data unit headers and sequence tables.

Note that in the embodiment of FIG. 1, data fragments reside in respective data fragment segments that occupy ascending positions in memory level 101. Because the data unit header that is associated with a respective data fragment segment is positioned in memory level 101 in proximity to the respectively associated data fragment segment, data unit headers and data fragment segments occupy alternating consecutively ascending positions in memory level 101, beginning at, or in proximity to, memory management boundary 110. In the embodiment of FIG. 1, sequence tables occupy descending positions in level 101, beginning at, or near, memory management boundary 110.

With continuing reference to FIG. 1, dual-level segmented memory 10 is seen to also include memory level 102. Memory level 102 comprises memory segments that reside logically above memory management boundary 110. Because memory level 101 comprises memory segments that reside below memory management boundary 110, level 101 may be considered the lower memory level, and level 102 may be considered the upper memory level. As seen in FIG. 1, upper memory level 102 comprises a plurality of data unit segments 141, 142 and 142 and comprises a plurality of corresponding object pointers 151, 152 and 153. Each of the object pointers points to a respective associated data unit segment. That is, each of the object pointers contains an address (generally, a starting address) of a respective associated data unit. Object pointer 151 points to data unit segment 141, object pointer 152 to data unit segment 142, and so forth. To promote simplicity, only three sets of object pointers and associated data unit segments are explicitly depicted in FIG. 1. However, the scope of the present invention is not constrained by a particular number of object pointers and data unit segments. As a practical matter, only the number of memory locations available in level 102 and the combined sizes of the data unit segments limit the number of data unit segments that may be stored by second memory level 102.

As shown in FIG. 1, in one embodiment, data units reside in respective data unit segments that occupy ascending positions in upper memory level 102. That is, data unit segment 141 occupies a position that is adjacent, or proximate, to memory management boundary 110; data unit segment 142 occupies a position above data unit segment 141; and data unit segment 143 occupies a position above data unit segment 142. Conversely, in the embodiment of FIG. 1, object pointers 151, 152 and 153 occupy respective consecutively descending position in memory level 102. The number of discrete memory locations respectively consumed each of data units 141, 142 and 143 will vary, perhaps widely, depending on the attributes of the data unit that is stored therein. In the embodiment of FIG. 1, memory level 102 is seen to exhibit an indeterminate number of contiguous memory location that are unused. That is, an unused area 104 may exist in memory level 102 between lowest object pointer 153 and uppermost data unit 143.

As indicated above, memory level 102 is used, in general, to store dynamic, or transitory, data. In one embodiment, dynamic data may be here considered to be data to which system relevance attaches for only relatively short duration of time. That is, dynamic data may be assumed to be data that will be erased, overwritten, or modified within a foreseeable, although possibly indeterminate, period of time. Alternatively, dynamic data may be considered to be data that is frequently, and perhaps randomly, accessed.

Figure 2:
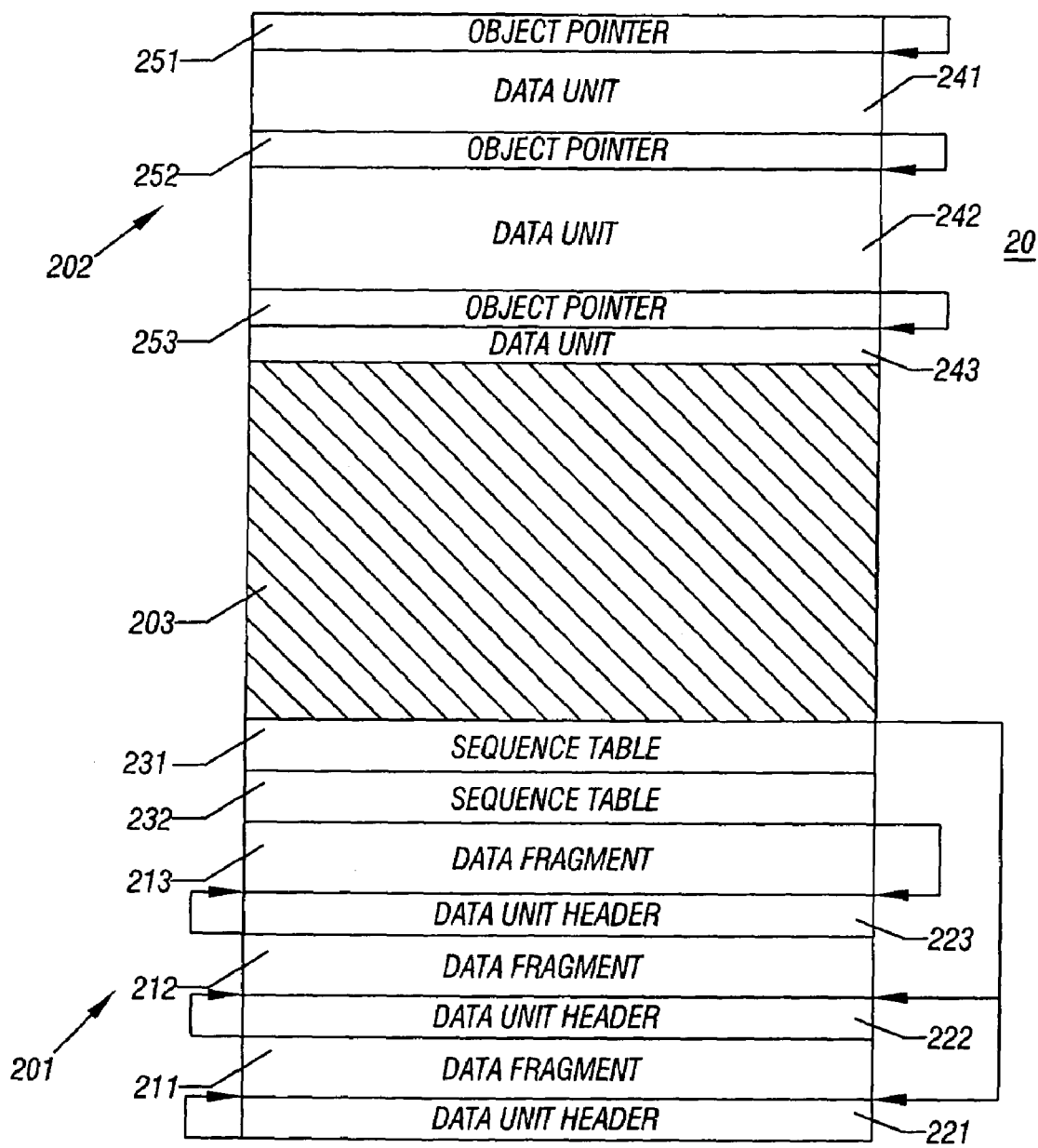
FIG. 2 is a memory map in accordance with a second embodiment of the invention.

Referring now to FIG. 2, depicted therein is an alternative embodiment of a dual-level segmented memory in accordance with one embodiment of the invention. In FIG. 2, memory 20 is seen to include a first, or lower, memory level 201 and a second, or upper, memory level 202. However, in contradistinction to memory 10, memory 20 does not exhibit a logically fixed, or permanent, memory management boundary. Rather, memory 20 is characterized by a configurable (or perhaps as aptly, flexible) memory management boundary 203. That is, the position (address) of memory management boundary 203 may vacillate over time, in response to the systolic nature of the respective contents of lower level 201 and upper level 202. In at least this sense, then, memory management boundary 203 may be considered to be configurable. As with respect to memory 10, lower level 201 of memory 20 is used to store a first type of data, e.g., persistent data; whereas upper level 202 is used to store a second type of data, e.g., dynamic, or transitory, data.

As seen in FIG. 2, lower memory level 201 comprises a number of data fragment segments 211, 212 and 213. Memory level 201 also comprises a number of data unit headers 221, 222 and 223 and sequence tables 231 and 232. Data fragment segments 211, 212 and 213 store respective persistent data fragments. Each of the data unit headers 221, 222, and 223 is respectively associated with a corresponding data fragment that is stored in a data fragment segment: (211, 221), (212, 222) and (213, 232). In addition, memory level 201 contains a requisite number of sequence tables. Sequence tables 231 and 232 contain information that link and order discrete data fragment segments in a manner that defines a coherent data unit. For illustrative purposes, sequence table 231 is shown in FIG. 2 to link data fragments stored in data fragment segments 211 and 212. Be aware that, in general, the sequence tables have the capability to link a large number of data fragments, even though only two are shown in FIG. 2. Furthermore, a sequence table need not link data fragment segments that occupy contiguous or consecutive positions in memory level 201. As illustrated in FIG. 2, data unit headers and data fragment segments occupy alternately ascending positions in lower memory level 201, that is, in order: data unit header 221, data fragment segment 211; data unit header 222, data fragment segment 212; data unit header 223, data fragment segment 213; etc. Furthermore, in the embodiment of FIG. 2, sequence tables 231 and 232 occupy descending contiguous positions in an upper portion of second memory level 201.

With continued reference to FIG. 2, upper memory level 202 comprises a number of data unit segments 241, 242 and 243 that store corresponding data units. A number of object pointers 251, 252, and 253 are each respectively associated with a data unit and contain, typically, the starting address of an associated data unit. In the embodiment of FIG. 2, object pointers and data units occupy alternately descending positions in upper memory level 202. That is, object pointer 251 occupies an uppermost position in memory level 202 and contains a pointer to the starting address of data unit 241, which occupies a data unit segment directly below object pointer 251. Similarly, object pointers 252 and 253 occupy descending positions in level 202 and contain pointers to, respectively, the starting addresses of data unit 242 and data unit 243, which data units occupy data unit segments below object pointer 252 and object pointers 253, respectively.

Note that data units and object pointers are arranged and filled in upper level 202 in a manner that obviates the need for a fixed memory management boundary. Accordingly, memory management boundary 203 is configurable and may be logically (e.g., as by software) defined to exist anywhere in unused area 203 that subsists between the uppermost sequence table 231 of level 201 and the lowermost data unit segment 243 of level 202.

As to operation, recall that a significant desideratum of the dual-level segmented memory illustrated in FIG. 1 and FIG. 2 is the provision of an efficient and effective technique to store dissimilar types (e.g., persistent and dynamic) of data in a unified memory device. The experienced practitioner will appreciate that "persistent" and "dynamic" are contextually relative terms that are largely insusceptible to precise definition. However, a useful definition of "dynamic" data has been provided supra. In one sense "persistent" data may simply be considered to be any data that is not dynamic. Beyond that, persistent data may be viewed as data that has sustained relevance to the system in question, such as data that in a conventional memory system is a candidate for storage in a nonvolatile memory device.

With this in mind, one contemplated application of an embodiment of the invention may be as embedded memory for a portable communications or computing device. In this environment, there often arise situations in which data (as defined above) is downloaded from a remote source to the portable device. The data itself may correspond to myriad types of content, such as graphical images, text, or an application program, to suggest but a few.

Assume, for example, that the "data" in question constitutes an application program (or an operating system ultimately to be run on the portable device). Initially, the application will be stored as dynamic data in the upper level 102 of memory 10. The application program requests memory from a resident operating system or file system. For example, an ALLOC[ ] function may dedicate the quantum of memory in upper level 102 that is required to run the application program. In certain embodiments, heap algorithms are applied in the execution of the application to manage dynamic objects, (e.g., data units) in upper level 102. Some circumstances may dictate that the application program, initially stored in upper level 102, as dynamic data, be promoted to "persistent" status and be relocated, or simply copied, to lower level 101. As an example, the criterion for promotion to persistent status may simply be confirmation that the application has been received sans transmission error. In this instance, the criterion for promotion may simply be checksum compliance. However, the subject invention is not limited to a specific technique for promotion from dynamic to persistent status.

Upon promotion to persistent status, the application program may be stored in level 101 as persistent data. Fragmented store algorithms may be conventionally employed to deconstruct the application program into the requisite number of data fragments that are stored in segments in lower memory level 101.

The capability to efficiently manage diverse(for example, persistent and dynamic) types of data in a unified memory subsystem is considered to represent a valuable enhancement to many types of processor-based systems, including but not limited to computer systems, wireless communications equipment, instrumentation apparatus, and consumer electronic devices.

Figure 3:
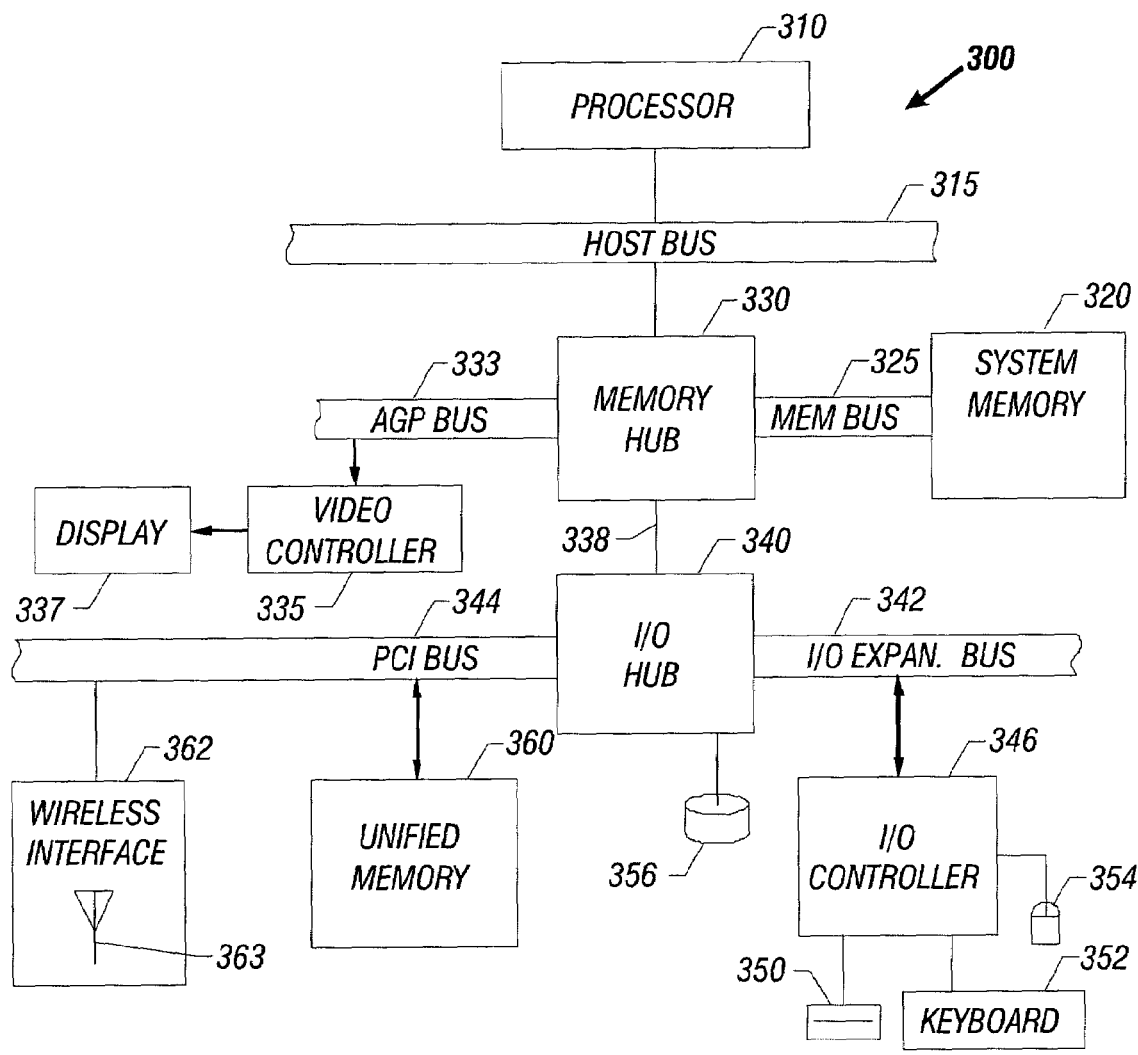
FIG. 3 is a block diagram of a processor-based system that incorporates a dual-level segmented memory in accordance with one embodiment of the invention.

FIG. 3 is a block diagram of an exemplary processor-based system into which embodiments of the invention may be incorporated. With specific reference now to FIG. 3, in one embodiment the invention may be incorporated into a system 300. System 300 is seen to include a processor 310, which may include a general-purpose or special-purpose processor. Processor 310 may be realized as a microprocessor, microcontroller, an application-specific integrated circuit (ASIC), a programmable gate array (PGA), and the like. As used herein, the term "computer system" may refer to any type of processor-based system, such as a mainframe computer, a desktop computer, a server computer, a laptop computer, an appliance, a set-top box, or the like.

In one embodiment, processor 310 may be coupled over a host bus 315 to a memory hub 330, which, in turn, may be coupled to a system memory 320 via a memory (MEM) bus 325. Memory hub 330 may also be coupled over an Advanced Graphics Port (AGP) bus 333 to a video controller 335, which may be coupled to a display 337. AGP bus 333 may conform to the Accelerated Graphics Port Interface Specification, Revision 2.0, published May 4, 1998, by Intel Corporation, Santa Clara, Calif.

Memory hub 330 may also be coupled (via a hub link 338) to an input/output (I/O) hub 340 that is coupled to a input/output expansion bus (I/O EXPAN) 342 and to a Peripheral Component Interconnect (PCI) bus 344, as defined by the PCI Local Bus Specification, Production Version, Revision 2.1 dated in June 1995. The I/O expansion bus (I/O EXPAN) 342 may be coupled to an I/O controller 346 that controls access to one or more I/O devices. As shown in FIG. 3, these devices may include in one embodiment storage devices, such as a floppy disk drive 350, and input devices, such as keyboard 352 and mouse 354. I/O hub 340 may also be coupled to, for example, hard disk drive 356 and compact disc (CD) drive (not shown). It is to be understood that other storage media may also be included in computer system 300.

In an alternate embodiment, the I/O controller 346 may be integrated into the I/O hub 340, as may other control functions. PCI bus 344 may also be coupled to various components including, for example, a memory 360 that in one embodiment, may be a multilevel, segmented unified memory device much as has been described herein. Additional devices may be coupled to the I/O expansion bus 342 and to PCI bus 344. Such devices include an input/output control circuit coupled to a parallel port, a serial port, a non-volatile memory, and the like.

Further shown in FIG. 3 is a wireless interface 362 coupled to the PCI bus 344. The wireless interface may be used in certain embodiments to communicate with remote devices. As shown in FIG. 3, wireless interface 362 may include a dipole or other antenna 363 (along with other components not shown in FIG. 3). While such a wireless interface may vary in different embodiments, in certain embodiments the interface may be used to communicate via data packets with a wireless wide area network (WWAN), wireless local-area network (WLAN), a BLUETOOTH™-compliant device or system or another wireless access point. In various embodiments, wireless interface 362 may be coupled to system 300, which may be a notebook personal computer, via an external add-in card, or an embedded device. In other embodiments wireless interface 362 may be fully integrated into a chipset of system 300.

Although the description makes reference to specific components of the system 300, it is contemplated that numerous modifications and variations of the described and illustrated embodiments may be possible. More so, while FIG. 3 shows a block diagram of a system such as a notebook personal computer, it is to be understood that embodiments of the present invention may be implemented in another wireless device such as a cellular phone, personal digital assistant (PDA) or the like. In such embodiments, a memory system in accordance with an embodiment may be coupled to an internal bus which is in turn coupled to a microprocessor and a peripheral bus, which may in turn be coupled to a wireless interface and an associated antenna such as a dipole antenna, helical antenna, global system for mobile communication (GSM) antenna, and the like.

In the Description above, the invention has been set forth in the context of specific embodiments, in a manner that is intended to be illustrative and to convey a thorough comprehension of the invention. In one embodiment, a multi-level segmented memory is partitioned so that persistent data is stored in a first level and dynamic data is stored in a second level. Fragmented store algorithms may be used to assign data fragments to data fragment segments in the first level. Sequence tables in the first level may appropriately link data fragments. In the second level, dynamic objects (for example, data units) are stored in a manner determined by the operation of heap algorithms. Dynamic objects may be promoted to persistent status, whereby a dynamic object is initially stored in the second level and is subsequently (upon satisfaction of a preestablished criterion) copied to the first level. In this manner, efficient memory management is imparted to a unified memory subsystem whose performance characteristics are amenable to storage of both persistent and dynamic data.

However, one of ordinary skill in the art pertinent to the design and operation of memory systems will appreciate that various modifications and changes may be imparted to the embodiments specifically described herein, without departure from the scope of the invention. For example, the invention has been described here for convenience with reference to a dual-level memory system. However, the invention contemplate arrangements in which the memory is deemed to exhibit more than two levels. In this regard, the invention may be used to discriminate between data of numerous types, not merely between "dynamic" and "persistent," as explicitly described above. Furthermore, the entire memory system may be partitioned in various ways not expressly described herein, but that are familiar to those skilled in the art. For example, the memory management programming used to manage the multilevel memory system may be allocated to storage locations on the same memory device. Alternatively, the memory management and data storage functions may be separately distributed between discrete memory devices. In addition, although it has been suggested here that the invention may readily be applied to OUMs, other unified memory types, now existing or hereafter developed, are likewise beneficiaries of the invention.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    causing data of a first type to be stored in a first level of a unified memory device and data of a second type to be stored in a second level of the unified memory device;
    causing a logical memory management boundary to be disposed between the first level and the second level;
    causing data fragments to be stored in respectively ascending positions in the first level by application of a fragmented store algorithm;
    causing at least one sequence table to be stored in the first level, the at least one sequence table including information defining an order in which the data fragments are stored, and
    causing data units to be stored in respectively ascending positions in the second level.

2. A method as defined in claim 1, wherein the data of a first type is persistent data and the data of a second type is dynamic data.

3. A method as defined in claim 1, further comprising first storing an application in the second level and later storing the application in the first level.

4. A method as defined in claim 3, further comprising deconstructing the application into a plurality of data fragments using the fragmented store algorithm.

5. A method as defined in claim 1, further comprising storing unit headers between the data fragments.

6. A method as defined in claim 1, further comprising causing the at least one sequence table to be stored adjacent to the logical memory management boundary.

7. An apparatus comprising:
    a first level to store persistent data including a plurality of data fragments and a plurality of unit headers, each of the unit headers to be associated with a respective one of the plurality of data fragments;
    a second level to store dynamic data including a plurality of object pointers and a plurality of data units, each of the object pointers to be associated with a respective one of the plurality of data units;
    a memory management boundary disposed between the first level and the second level, and wherein the first level is to comprise, in respectively descending order with respect to the memory management boundary:
        a sequence tablet;
        a first data fragment; and
        a first unit header.

8. An apparatus as defined in claim 7, wherein the memory management boundary is logically fixed.

9. An apparatus as defined in claim 8, wherein the first level comprises an unused area between a data fragment segment and a sequence table and the second level comprises an unused area between an object pointer and a data unit segment.

10. An apparatus as defined in claim 7, wherein the memory management boundary is logically configurable.

11. An apparatus as defined in claim 10, further comprising an unused area between a sequence table in the first level and a data unit in the second level.

12. An apparatus as defined in claim 11, wherein object pointers and respective associated data units are to occupy alternatively descending positions in the second level.

13. A machine readable storage article comprising instructions that, if executed, enable a system to:
    store a plurality of persistent data fragments in the a first memory level of a unified memory device;
    store a plurality of unit headers in the first memory level, each of the unit headers being associated with a respective one of the plurality of persistent data fragments and including information to identify a source of the respective persistent data fragment;
    store a plurality of sequence tables in the first memory level;
    store a plurality of dynamic data units in the a second memory level of the unified memory device; and
    store a plurality of object pointers in the second memory level, each of the object pointers associated with a respective one of the dynamic data units.

14. A machine readable storage article as defined in claim 13, further comprising instructions that, if executed, enable the system to:
 cause data fragments to occupy ascending segments positions in the first memory level;
 cause sequence tables to occupy descending segments positions in the first memory level;
 cause object pointers to occupy descending segments positions in the second memory level; and
 cause data units to occupy ascending segments positions in the second memory level.

15. A machine readable storage article as defined in claim 14 further comprising instructions that, if executed, enable the system to:
 cause data fragments and unit headers to occupy respectively alternating positions in the first memory level;
 cause sequence tables to occupy contiguous positions in the first memory level;
 cause object pointers to occupy contiguous positions in the second memory level; and
 cause data units to occupy contiguous positions in the second memory level.

16. A machine readable storage article as defined in claim 13 further comprising instructions that, if executed, enable the system to:
 cause data fragments to occupy ascending positions in the first memory level;
 cause sequence tables to occupy descending positions in the first memory level;
 cause object pointers to occupy descending positions in the second memory level; and
 cause data units to occupy ascending positions in the second memory level.

17. A machine readable storage article as defined in claim 13 further comprising instructions that, if executed, enable the system to:
 cause data fragments and unit headers to occupy respectively alternating positions in the first memory level;
 cause sequence tables to occupy contiguous positions in the first memory level; and
 cause object pointers and data units to occupy respectively alternating positions in the second memory level.

18. A system comprising:
 a storage device to store instructions that, if executed, enable the system to:
 store persistent data in a first level of a unified memory device, the persistent data comprising a plurality of data fragments;
 store dynamic data in a second level of the unified memory device, the dynamic data comprising a plurality of data units; and
 store a plurality of unit headers in the first level, wherein each unit header is associated with a data fragment and a data unit;
 store at least one sequence table in the first level, the sequence table to link data fragments and to define an order in which the data fragments are stored; and
 an antenna coupled to the storage device.

19. A system as defined in claim 18, further comprising instructions that, if executed, enable the system to:
 store a plurality of object pointers in the second level, each object pointer being associated with a respective one of the data units.

20. A system as defined in claim 19, further comprising instructions that, if executed, enable the system to store data units in the second level in contiguous memory segments that ascend from a logically fixed memory management boundary.

21. A system as defined in claim 19, further comprising instructions that, if executed, enable the system to establish a configurable memory management boundary between the first level and the second level.

* * * * *

UNITED STATES PATENT AND TRADEMARK OFFICE
CERTIFICATE OF CORRECTION

PATENT NO. : 7,073,040 B2  
APPLICATION NO. : 10/668713  
DATED : July 4, 2006  
INVENTOR(S) : John C. Rudelic Page 1 of 1

It is certified that error appears in the above-identified patent and that said Letters Patent is hereby corrected as shown below:

Column 8:
Line 63, delete "the".

Column 9:
Line 4, delete "segments";
Line 6, delete "segments";
Line 8, delete "segments";
Line 10, delete "segments".

Signed and Sealed this

Twenty-third Day of January, 2007

JON W. DUDAS
*Director of the United States Patent and Trademark Office*